United States Patent
Sugita et al.

(10) Patent No.: US 7,385,317 B2
(45) Date of Patent: Jun. 10, 2008

(54) LINEAR MOTOR NOT REQUIRING YOKE

(75) Inventors: Satoshi Sugita, Nagano (JP); Yuqi Tang, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 115 days.

(21) Appl. No.: 11/126,670

(22) Filed: May 11, 2005

(65) Prior Publication Data
US 2005/0253464 A1    Nov. 17, 2005

(30) Foreign Application Priority Data
May 12, 2004   (JP)   ............................. 2004-142768

(51) Int. Cl.
*H02K 41/03*   (2006.01)
(52) U.S. Cl. ............................. 310/12; 310/15; 310/16
(58) Field of Classification Search .................. 310/12, 310/13, 15, 16
See application file for complete search history.

(56) References Cited
U.S. PATENT DOCUMENTS

| | | | |
|---|---|---|---|
| 3,707,924 A * | 1/1973 | Barthalon et al. | 104/290 |
| 4,839,545 A * | 6/1989 | Chitayat | 310/12 |
| 5,910,691 A * | 6/1999 | Wavre | 310/12 |
| 6,329,728 B1 | 12/2001 | Kitazawa et al. | |
| 6,831,379 B2 * | 12/2004 | Ohto et al. | 310/12 |
| 2002/0130562 A1 * | 9/2002 | Tamura et al. | 310/12 |

FOREIGN PATENT DOCUMENTS

| | | | |
|---|---|---|---|
| JP | 60131071 A | * | 7/1985 |
| JP | 07-067315 | | 3/1995 |
| JP | 2000-262034 | | 9/2000 |
| JP | 2001-286121 | | 10/2001 |
| JP | 2001-286122 | | 10/2001 |
| JP | 2001-352747 | | 12/2001 |
| JP | 2002-325417 | | 11/2002 |

* cited by examiner

*Primary Examiner*—Karl Tamai
*Assistant Examiner*—David W. Scheuermann
(74) *Attorney, Agent, or Firm*—Rankin, Hill & Clark LLP

(57) ABSTRACT

A linear motor not requiring a yoke structure is provided. A first unit forming a stator is constructed of two permanent magnet rods. The permanent magnet rods each have a magnetically permeable shaft and a permanent magnet row having a plurality of permanent magnets so arranged that opposite polarities of their magnetic poles alternately appear. The permanent magnet row of the permanent magnet rod is arranged with a positional difference of 180° in an electrical angle from the permanent magnet row of the permanent magnet rod. The second unit that constitutes a moving member includes unit cores and winding sets arranged alternately in an axial direction of the shaft. The winding set includes two excitation windings through each of which the permanent magnet rod loosely extends. One excitation winding of the winding set is excited with a phase difference of 180° in an electrical angle from the other excitation winding.

8 Claims, 7 Drawing Sheets

LINEAR MOTOR NOT REQUIRING YOKE

BACKGROUND OF THE INVENTION

The present invention relates to a linear motor.

Japanese Patent Laid-open publication No. 2001-286122 discloses a linear motor comprising a moving member constructed of a permanent magnet rod and a stator constructed of an armature. The permanent magnet rod has a magnetically permeable shaft and a permanent magnet row. The permanent magnet row comprises a plurality of permanent magnets which are so magnetized that each has a magnetic pole with one polarity on its entire outer circumferential surface and which are arranged on the shaft so that opposite polarities alternately appear in an axial direction of the shaft. The armature has an armature core and a plurality of excitation windings wound in a ring-like shape in a circumferential direction of the permanent magnet rod. The armature core comprises divided cores combined together to hold the excitation windings in between. Each of the divided cores has a cylindrical yoke structure forming a yoke, a cylindrical magnetic pole surface forming portion, and a ring-shaped connecting portion connecting the yoke structure and the magnetic pole surface forming portion.

In the conventional linear motors, however, since the cylindrical yoke structure must be provided, the armature core has a complicated shape. Further, the divided cores are formed by cutting a silicon iron material. This raises the manufacturing cost of the armature core and also increases a core loss due to an eddy current. The conventional linear motors have another problem of a low degree of freedom of design.

An object of the present invention is to provide a linear motor that does not require a cylindrical yoke structure.

Another object of the present invention is to provide a linear motor which has a lowered manufacturing cost of the armature core, a reduced core loss and a higher degree of freedom of design.

SUMMARY OF THE INVENTION

A linear motor of the present invention comprises a first unit and a second unit which are constructed so that one of them works as a moving member and the other as a stator. The first unit has a plurality of permanent magnet rods arranged parallel at predetermined intervals and a rod support member supporting the permanent magnet rods. Each of the permanent magnet rods comprises a magnetically permeable shaft and a permanent magnet row having a plurality of permanent magnets. The permanent magnets are so magnetized that each has a magnetic pole with one polarity on its entire outer circumferential surface and arranged on the shaft in such a manner that opposite polarities alternately appear in an axial direction of the shaft. The second unit has unit cores and winding sets. The unit cores each have a plurality of through-holes through which the plurality of permanent magnet rods loosely extend respectively. Each of the winding sets has a plurality of excitation windings. Each of the excitation windings is so formed that a winding conductor is wound in a ring-like shape and has a space surrounded by the winding conductor, through which the corresponding permanent magnet rod loosely extends. The winding sets are arranged in such a manner that the excitation windings each corresponds to each of the permanent magnet rods. The unit cores and the winding sets are alternately arranged in the axial direction. Then, a positional difference in an electrical angle between the permanent magnet rows of the plurality of permanent magnet rods and an excitation phase difference in electrical angle between the plurality of excitation windings of the winding sets through which the plurality of permanent magnet rods extend respectively are so determined that the moving member can be moved relative to the stator in the axial direction by exciting the plurality of excitation windings. With this linear motor, a magnetic flux generated by the excitation windings flows in cyclically the plurality of permanent magnet rods and unit cores. This realizes a linear motor requiring no such cylindrical yoke structure as used in the conventional motor, making the manufacture of the core easy.

A linear motor having 2n permanent magnet rods (n is a natural number) includes unit cores each having 2n through-holes and winding sets each having 2n excitation windings. In this case, of the 2n permanent magnet rods, the permanent magnet rows on n permanent magnet rods can be arranged with a positional difference of 180° in an electrical angle from the permanent magnet rows of the remaining n permanent magnet rods. And n excitation windings of the winding sets, through which the n permanent magnet rods extend, are excited with a phase difference of 180° in an electrical angle from n excitation windings of the winding sets, through which the remaining n permanent magnet rods extend are excited with a phase difference of 180° in an electrical angle between them. With this arrangement, a polarity appears on a magnetic pole of an inner circumferential surface surrounding a through hole of a unit core and an opposite polarity appears on a magnetic pole of the other through hole of the unit core. When an appropriate polarity corresponding to the polarities of the permanent magnets of the permanent magnet rod appears on each of the inner circumferential surfaces of the through holes aligned in the axial direction, the thrust force in the axial direction can be generated. The magnetic flux generated by the excitation windings of each winding set flow in cyclically the 2n permanent magnet rods and the unit cores situated on both sides of the excitation windings. With this linear motor, it is easy to increase or reduce a thrust force by changing the number of permanent magnet rods and core units and thereby to enhance the degree of freedom of design.

The first unit and the second unit may be constructed so that the first unit functions as a stator and the second unit as a moving member or that the first unit functions as a moving member and the second unit as a stator. Where the first unit is made as a moving member and the second unit as a stator, a plurality of permanent magnets may be arranged on the shaft except for both of the axial end portions of the shaft, with the axial end portions movably mounted on a mounting member such as a mount and a case.

A linear motor with 3n permanent magnet rods (n is a natural number) comprises unit cores each having 3n through-holes and winding sets each having 3n excitation windings. In this case, the 3n permanent magnet rods are divided into three groups. The permanent magnet rows of n permanent magnet rods in the first group, the permanent magnet rows of n permanent magnet rods in the second group, and the permanent magnet rows of n permanent magnet rods in the third group are arranged with a positional difference of 120° in an electrical angle from each other. The n excitation windings of each winding set, through which the n permanent magnet rod in the first group extend, the n excitation windings of each winding set, through which the n permanent magnet rod in the second group extend, and the n excitation windings of each winding set, through which the n permanent magnet rod in the third group extend, are excited with a phase difference of 120° in an electrical angle from each other. With this arrangement, the magnetic flux generated by the excitation windings of each winding set flows in cyclically 3n permanent magnet rods and the unit cores situated on both sides of the excitation windings. Since this linear motor can be constructed by arranging at least two unit cores in the axial direction, the motor dimension in the axial direction can be made smaller.

In this case, too, the first unit and the second unit may be so constructed that the first unit functions as a stator and the second unit as a moving member or that the first unit functions as a moving member and the second unit as a stator. Where the first unit is made a moving member and the second unit a stator, a plurality of permanent magnets may be arranged on the shaft except for both of the axial end portions, with the axial end portions movably mounted on a mounting member such as mount and case.

It is preferred that the linear motor further include a spacer member that has fit holes in which the excitation windings forming the winding set are fitted. This makes it possible to firmly hold the excitation windings between the unit cores and to secure a magnetic resistance between the adjoining unit cores. This also facilitates an assembly process.

The second unit may include an odd number of unit cores arranged in the axial direction and excitation windings for a plurality of phases mounted on even-numbered unit cores, counted from the end. The excitation windings are each formed of a winding conductor to generate a magnetic flux in the direction in which a plurality of through-holes are arrayed. In this case, a thrust force can be generated in the axial direction by exciting the plurality of phases of excitation windings so as to generate appropriate polarities in the magnetic poles corresponding to the electrical angles of the permanent magnet rows of the permanent magnet rods. With this arrangement, magnetic fluxes generated by the plurality of phases of excitation windings flows in cyclically a plurality of permanent magnet rods, unit cores on both sides of the even-numbered unit core, and the even-numbered unit core. In this linear motor, when 3 phase currents are used, two permanent magnet rods and three excitation windings are used to provide a minimum size unit. Thus, by increasing or reducing the number of minimum size units, the thrust force can be controlled and the degree of freedom of design enhanced.

Since this invention can provide a linear motor that requires no cylindrical yoke structure, the unit cores can be formed in the same shape of a transverse cross section with respect to the axial direction. Thus, it is preferred that the unit cores be formed of a plurality of laminated electromagnetic steel plates. This construction can lower the manufacturing cost of an armature core and also reduce a core loss. Further, by appropriately selecting the number of electromagnetic steel plates, it becomes possible to obtain a desired thickness of the magnetic poles corresponding to the permanent magnet pitch. This in turn results in a linear motor with an enhanced degree of freedom of design.

It is preferable to arrange the cooling pipe partly along the excitation windings. With this arrangement, directly cooling the excitation windings with the cooling pipe can enhance a cooling efficiency and thereby increase a continuously rated thrust force of the linear motor. This in turn restricts possible degradations of accuracy due to thermal expansions.

It is preferred that those magnetic pole surfaces of the two unit cores situated at the ends of a series of unit cores which face the permanent magnet rows be situated farther away from the permanent magnet rows than the magnetic pole surfaces of other unit cores. It is also desired that those magnetic pole surfaces of the two unit cores situated at the ends of a series of unit cores which face the permanent magnet rows be shaped so as to gradually incline away from the permanent magnet rows toward the outside in the axial direction. This arrangement can reduce a cogging force generated by the magnetic fluxes concentrating at the ends of a plurality of unit cores.

A magnetic pole pitch $\tau p$ of the permanent magnet row and a magnetic pole pitch $\tau s$ of the unit cores preferably have a relationship of $\tau s:\tau p=3m\pm1:3m$ (where m is a natural number). Since this arrangement evenly differences the cycle of the cogging force generated by each of the magnetic poles arranged at the pitch of $\tau p$, the cogging forces cancel each other, reducing a total cogging force.

With this invention, a linear motor can be realized that require no such cylindrical yoke structure as used in the conventional motors, thereby facilitating the fabrication of the cores.

DETAILED DESCRIPTION OF PREFERRED EMBODIMENTS

Figure 1:
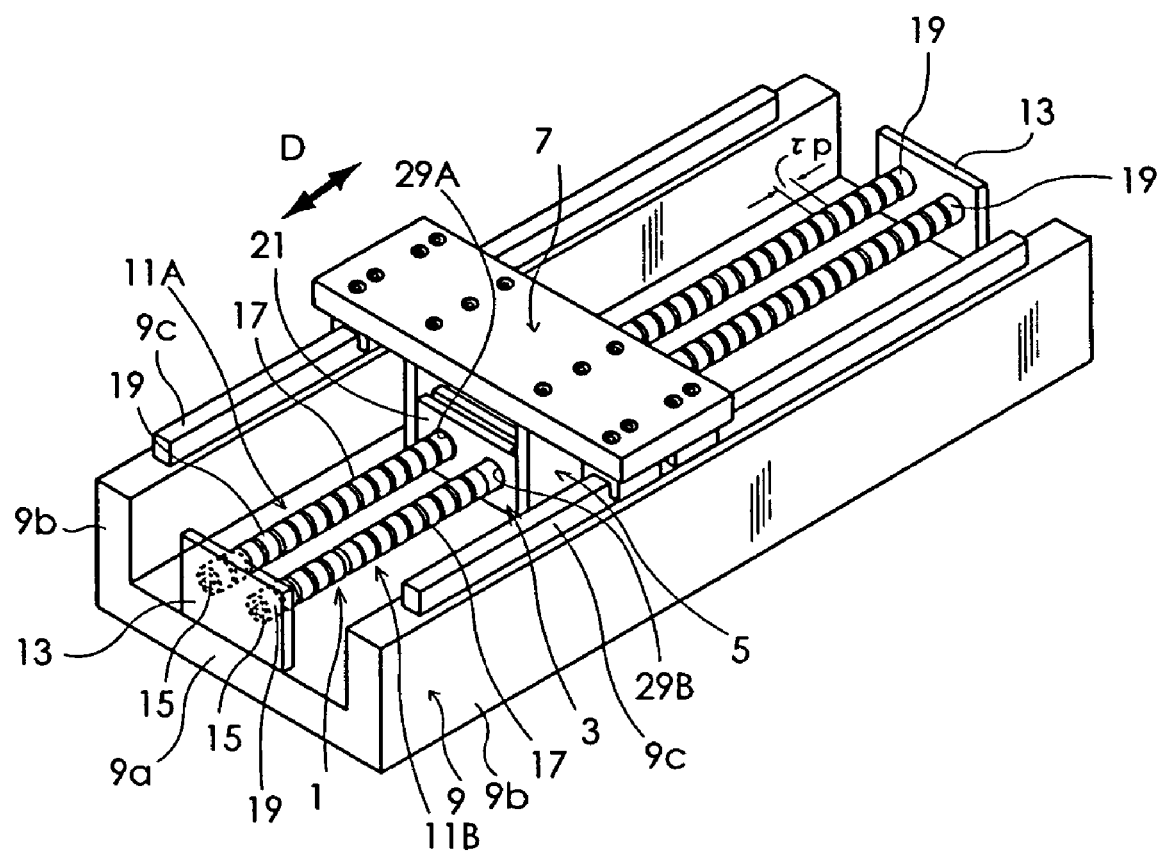
FIG. 1 is a perspective view showing a linear motor of a first embodiment of this invention.

Now, embodiments of the present invention will be described in detail by referring to the accompanying drawings. FIG. 1 is a perspective view of a linear motor as a first embodiment of this invention. As shown in FIG. 1, the linear motor of this embodiment has a first unit 1 forming a stator, a second unit 3 forming a moving member, a unit support member 5, a moving stage 7 and a mount 9. The first unit 1 comprises 2n (two in this case) permanent magnet rods 11A, 11B and two rod support members 13. The permanent magnet rods 11A, 11B each have a magnetically permeable, elongate, cylindrical shaft 15 and a permanent magnet row 17. The permanent magnet row 17 has a plurality of permanent magnets 19 so magnetized that each has a magnetic pole with one magnetic polarity on its entire outer circumference and so arranged on the shaft 15 that opposite polarities of their magnetic poles alternately appear in the direction of axis of the shaft 15. In this example, the permanent magnet row 17 of the permanent magnet rod 11A is arranged with a positional difference of 180° in an electrical angle from permanent magnet row 17 of the permanent magnet rod 11B. More precisely, any one of the permanent magnets 19 with a polarity, on the permanent magnet rod 11A, and any one of the permanent magnets 19 with the opposite polarity, on the permanent magnet rod 11B, are both located at a same distance away from one edge of each of the permanent magnet rods 11A and 11B, and have the opposite polarities. The rod support members 13 are fixedly mounted on a base 9a of the mount 9 to support the ends of the two permanent magnet rods 11A, 11B.

Figure 2:
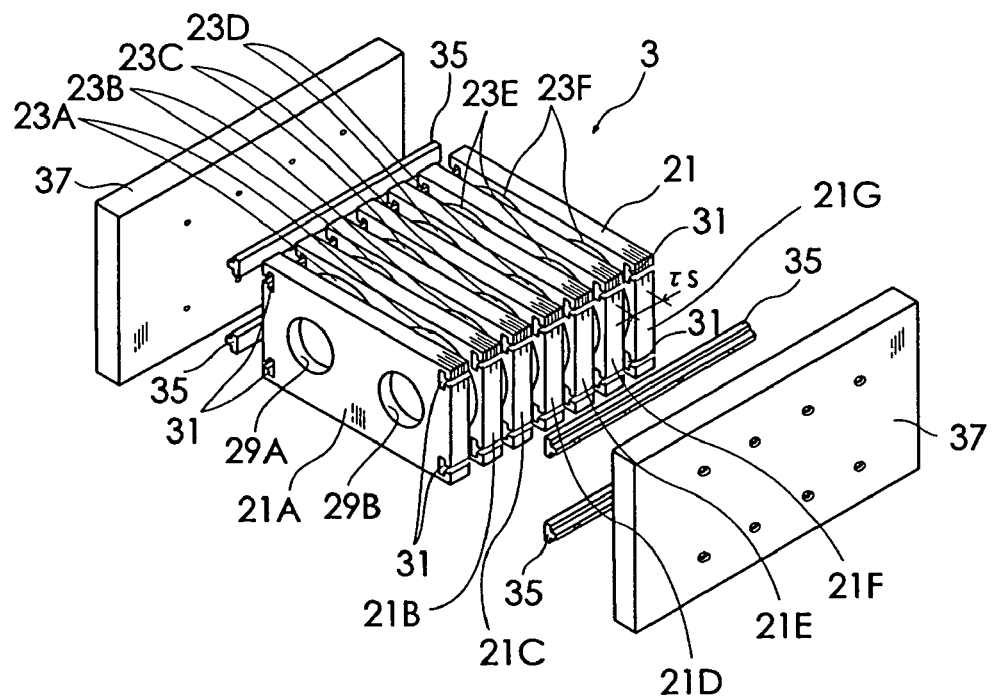
FIG. 2 is an exploded perspective view showing a part of the linear motor of the first embodiment of this invention.
Figure 3:
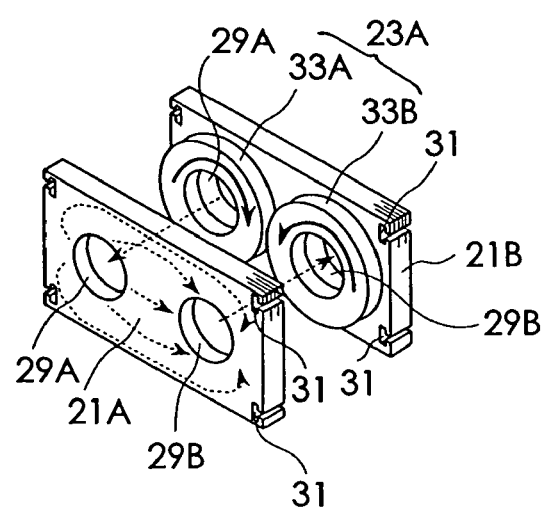
FIG. 3 is an exploded perspective view showing a part of a second unit in the linear motor of the first embodiment of this invention.
Figure 4:
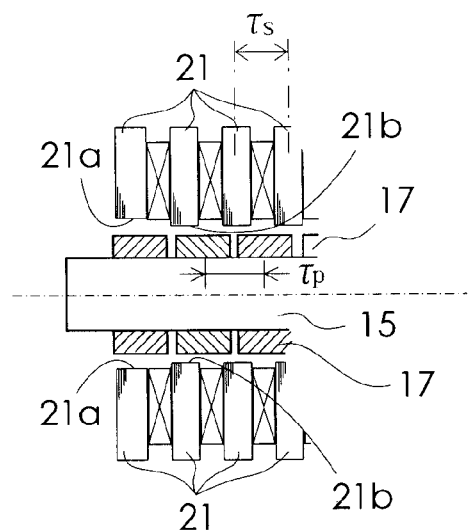
FIG. 4 is a cross section showing a part of the first unit and the second unit in the linear motor of the first embodiment of this invention.
Figure 5:
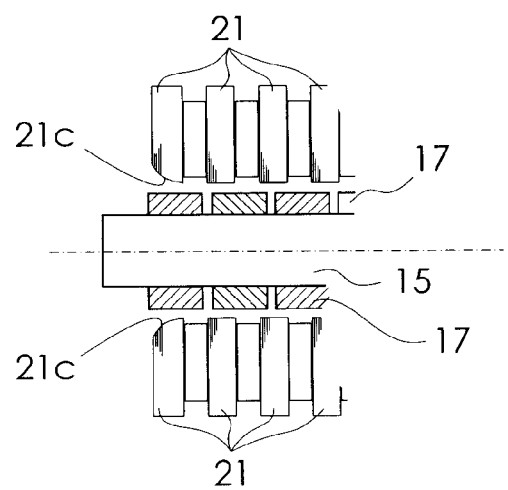
FIG. 5 is a cross section showing a part of the first unit and the second unit in a variation of the linear motor of the first embodiment of this invention.

The second unit 3, as shown in an exploded perspective view of FIG. 2, has seven unit cores 21A-21G and winding sets 23A-23F are alternately arranged in the direction of axis of the shaft 15. The unit cores 21A-21G are each shaped like a rectangular flat plate and comprise a plurality of electromagnetic steel plates laminated together in the direction of axis of the shaft 15. Each of the unit cores 21A-21G is formed with two circular through-holes 29A, 29B, through which the two permanent magnet rods 11A, 11B loosely extend, and also with two grooves 31 on each of opposing side walls thereof, which are T-shaped in transverse cross section and open toward the side. Inner circumferential surfaces surrounding the through-holes 29A, 29B form magnetic pole surfaces of the unit cores 21A-21G. The winding sets 23A-23F, as shown in an exploded perspective view of FIG. 3, each comprise two excitation windings 33A, 33B each of which is formed of a winding conductor which is wound in a ring-like shape and corresponds to the permanent magnet rod 11A, 11B, each of which loosely extends through a space surrounded by the corresponding excitation winding. In this example, one excitation winding 33A of the winding sets and the other excitation winding 33B are excited with a phase difference of 180° in an electrical angle. More precisely, a direction of current flowing in the excitation winding 33A and a direction of current flowing in the excitation winding 33B are in opposite directions. Currents of U, V, W, U, V and W phases are supplied to the excitation windings 33A of the winding sets 23A-23F, respectively. And currents of −U, −V, −W, −U, −V and −W phase, which have a differences of 180° in an electrical angle in U, V, W, U, V and W phases, are supplied to the other excitation windings 33B of the winding sets. The positional difference in an electrical angle between the permanent magnet rows 17 of the permanent magnet rods 11A, 11B and the excitation phase difference in an electrical angle between the excitation windings 33A, 33B of the winding sets 23A-23F through which the permanent magnet rods 11A, 11B extend, are determined such that the second unit 3 can be moved in the axial direction of the shaft 15 relative to the first unit 1 by energizing the excitation windings 33A, 33B of the winding sets 23A-23F as described above. Each of the winding sets 23A-23F is so held between two adjoining unit cores that the inner spaces of the winding sets 23A-23F are aligned with the through-holes 29A, 29B. In this example, a magnetic pole pitch $\tau p$ of the permanent magnet row 17 (FIG. 1) and a magnetic pole pitch $\tau s$ of the unit cores 21A-21G (FIG. 2) have a relationship of $\tau s : \tau p = 3m.+-.1:3m$ (where m is a natural number). As shown in FIG. 4, two unit cores situated at both ends of seven unit cores 21 each has the magnetic pole surface 21a facing the permanent magnet row 17. Each of the magnetic pole surfaces 21a can be situated farther away from the permanent magnet row 17 than magnetic pole surfaces 21b of other unit cores. Also, two of the seven unit cores 21A-21G that are situated at the ends may be so formed that their magnetic pole surfaces 21c facing the permanent magnet row 17 gradually incline away from the permanent magnet row 17 toward the outside in the axis direction, as shown in FIG. 5. This arrangement can reduce a cogging force generated by the magnetic fluxes concentrating at the ends of a plurality of unit cores.

As described above, the second unit 3 made up of the winding sets 23A-23F and the unit cores 21A-21G is secured to two support wall members 37 through elongate mounting members 35 fitted in the grooves 31 of the unit cores 21A-21G. The two support wall members 37 are secured to the moving stage 7, which in turn is slidably supported on rails 9c laid on the top of two side walls 9b of the mount 9. The unit support member 5 is made up of the mounting members 35 and the support wall members 37. Thus, the second unit 3 is so supported on the mount 9 as to be movable in the axis direction of the shaft 15.

In the linear motor of this embodiment, the directions of currents flowing in the excitation windings 33A, 33B included in each of the winding sets 23A-23F are differentiated to make opposite magnetic polarities appeared on the two magnetic pole surfaces (the circumferential surfaces surrounding the through holes 29A, 29B) of each of the unit cores 21A-21G, which face each of the permanent magnetic rods. The direction of the currents flowing in the excitation windings aligned in the axial direction, which are included in the winding sets, are changed depending on the polarities on the permanent magnets of the corresponding permanent magnet row which face the magnetic pole surfaces of the unit cores 21A-21G. This is done to generate a thrust force between the permanent magnet rows 17 of the permanent magnet rods 11A, 11B and the unit cores 21A-21G to displace the second unit 3 in the axial direction of the shaft 15. In this linear motor, as shown in FIG. 3, a magnetic flux generated by the excitation winding 33A and the excitation winding 33B of the winding set 23A, for example, flows in the permanent magnet rod (permanent magnet rod 11A) inside the excitation winding 33A, the inner circumferential surface (magnetic pole surface) surrounding the through-hole 29A of the unit core 21A, the inner circumferential surface (magnetic pole surface) surrounding the through-hole 29B of the unit core 21A, the permanent magnet rod (permanent magnet rod 11B) inside the excitation winding 33B, the inner circumferential surface (magnetic pole surface) surrounding the through-hole 29B of the unit core 21B, the inner circumferential surface (magnetic pole surface) surrounding the through-hole 29A of the unit core 21B, and the permanent magnet rod (permanent magnet rod 11A) inside the excitation winding 33A in this order. Therefore, the conventional cylindrical yoke structure is not required.

While in the linear motor of the first embodiment described above two (n=1) permanent magnet rods 11A, 11B are used as 2n permanent magnet rods, this invention can also be applied to cases where the number of permanent magnet rods used is other multiple of two, such as four (n=2) and six (n=3). In that case, n permanent magnet rows of the 2n permanent magnet rods need to be arranged with a positional difference of 180° in an electrical angle from the permanent magnet rows of the remaining n permanent magnet rods. And then n excitation windings of the winding sets, through which the n permanent magnet rods extend, need to be excited with a phase difference of 180° in an electrical angle from n excitation windings of the winding sets, through which the remaining n permanent magnet rods extend.

Figure 6:
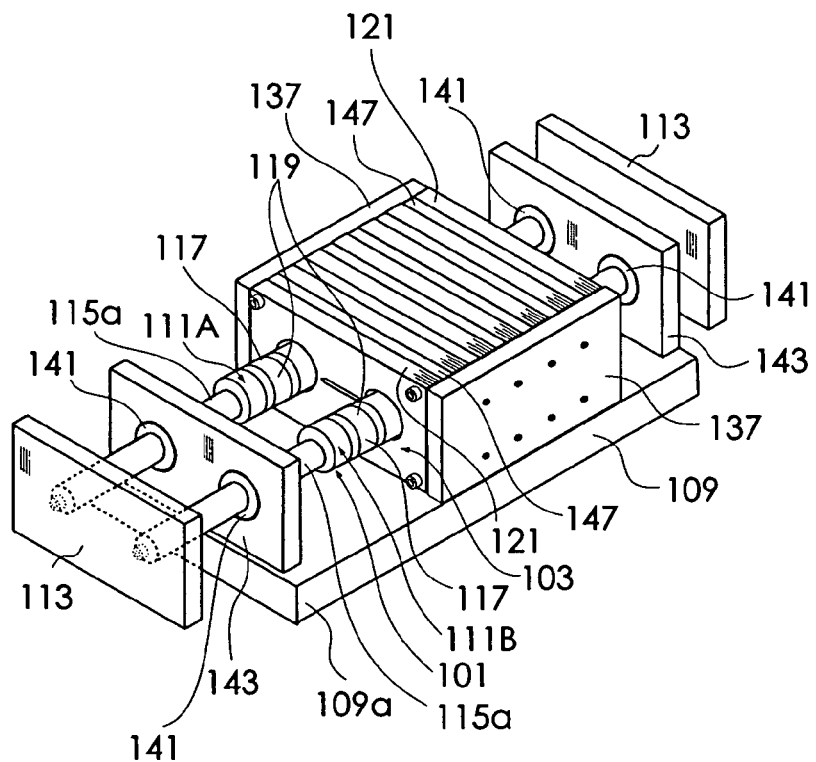
FIG. 6 is a perspective view showing a linear motor of a second embodiment of this invention.
Figure 7:
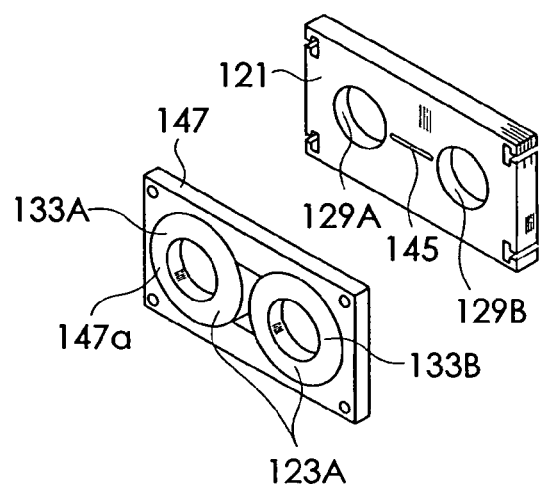
FIG. 7 is an exploded perspective view showing a part of a second unit in the linear motor of the second embodiment of this invention.

FIG. 6 is a perspective view of the linear motor as a second embodiment of this invention. In this example of the linear motor, a first unit 101 constitutes a moving member and a second unit 103 constitutes a stator, and basically the linear motor is run by the same operation as the linear motor of the first embodiment of FIG. 1. Permanent magnet rows 117 of two permanent magnet rods 111A, 111B in the first unit 101 each have a plurality of permanent magnets 119 arranged on shafts 115 excluding their axial end portions 115a. The axial end portions 115a of the shafts 115 of the permanent magnet rods 111A, 111B are movably supported through bearings 141 on rod support members 143 that are fixed to a base 109a of a mount 109. Coupling members 113 for connecting each of the ends of the two permanent magnet rods 111A, 111B are moved together with the two permanent magnet rods 111A, 111B. Two support wall members 137 secured to the second unit 103 are fixed to the base 109a of the mount 109. Thus, the second unit 103 is secured to the mount 109 and the first unit 101 is movably supported on the mount 109. In this example, as shown in an exploded perspective view of FIG. 7, unit cores 121 of the second unit 103 each have a slit-like through-hole 145 between through-holes 129A, 129B. The through-hole 145 has a function of reducing eddy currents flowing in the magnetic pole surface of the unit cores in a circumferential direction and linking magnetic fluxes efficiently. Between the adjoining two unit cores 121 is provided a spacer member 147 which is formed of a nonmagnetic synthetic resin and has fit holes 147a. In the fit holes 147a, are fitted excitation windings 133A, 133B which together form each of the winding sets 123A-123F.

Figure 8:
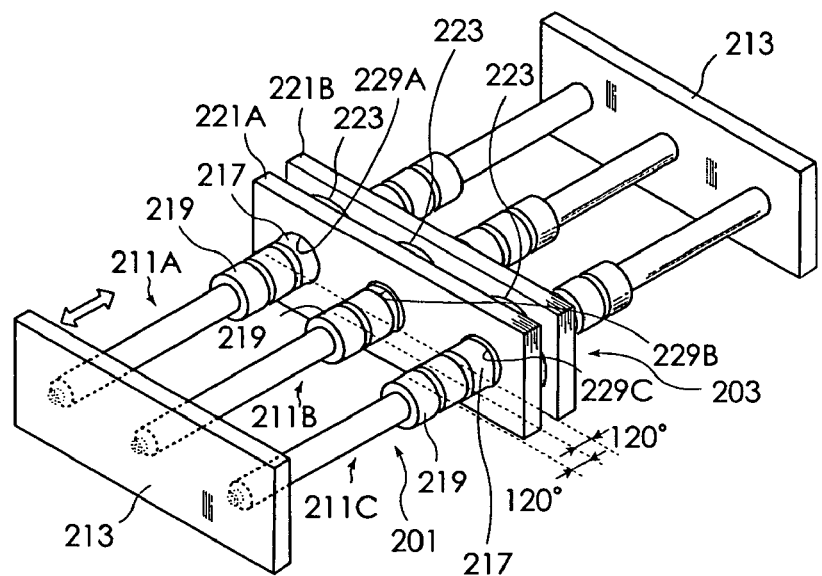
FIG. 8 is a perspective view showing a first unit and a second unit in a linear motor of a third embodiment of this invention.

FIG. 8 is a perspective view showing a first unit 201 and a second unit 203 of the linear motor as a third embodiment of this invention. In the linear motor of this embodiment, the first unit 201 comprises 3n (in this example, three) permanent magnet rods 211A-211C. The three permanent magnet rods 211A-211C have their permanent magnet rows 217 arranged with a positional difference of 120° in an electrical angle from each other. More specifically, when viewed in a direction in which three rods are aligned, one permanent magnet 219 of the permanent magnet rod 211A overlaps at one third of a permanent magnet 219 of the same polarity on the permanent magnet rod 211B and at two thirds of a permanent magnet 219 of the opposite polarity. When viewed in a direction in which three rods are aligned, one permanent magnet 219 of the permanent magnet rod 211B overlaps at one third of a permanent magnet 219 of the same polarity on the permanent magnet rod 211C and at two thirds of a permanent magnet 219 of the opposite polarity. When viewed in a direction in which three rods are aligned, one permanent magnet 219 of the permanent magnet rod 211A overlaps at one third of a permanent magnet 219 of the same polarity on the permanent magnet rod 211C and at two thirds of a permanent magnet 219 of the opposite polarity.

The second unit 203 has two unit cores 221A, 221B and a winding set 223 alternately arranged in the direction of axis of a shaft 215. The unit cores 221A, 221B each have three circular through-holes 229A-229C, through which three permanent magnet rods 211A-211C loosely extend respectively. Inner circumferential surfaces surrounding the through-holes 229A-229C form magnetic pole surfaces of the unit cores 221A, 221B. The winding set 223, as shown in an exploded perspective view of FIG. 9, comprises three excitation windings 233A-233C each of which is formed of a winding conductor which is wound in a ring-like shape, and the corresponding permanent magnet rod 211A-211C loosely extend through a space surrounded by the corresponding excitation winding. In this example, an excitation winding 233A of the winding set 223 through which the permanent magnet rod 211A extends, an excitation winding 233B of the winding set 223 through which the permanent magnet rod 211B extends, and an excitation winding 233C of the winding set 223 through which the permanent magnet rod 211C extends are excited with a phase difference of 120° in an electrical angle from each other. More specifically, U-, V- and W-phase currents flow in the excitation windings 233A-233C, respectively. Then, the winding set 223 is so held and bonded between the two adjoining unit cores 221 that the three spaces surrounded by the corresponding excitation windings 233A-233C align with the through-holes 229A-229C.

In the linear motor of this embodiment, when the first unit 201 is constructed as a stator and the second unit 203 as a moving member, the first unit 201 needs to be secured to the mount and the second unit 203 movably mounted on the mount, as in the first embodiment of FIG. 1. Where the first unit 201 is constructed as a moving member and the second unit 203 as a stator, the first unit 201 needs to be movably mounted on the mount and the second unit 203 secured to the mount, as in the second embodiment of FIG. 6.

Figure 9:
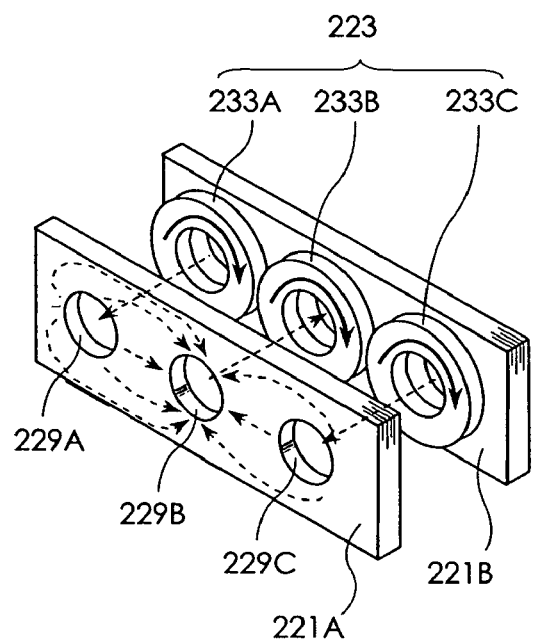
FIG. 9 is an exploded perspective view showing a part of the second unit in the linear motor of the third embodiment of this invention.

In the linear motor of this example, the directions of currents flowing in the excitation windings 233A-233C of the winding set 223 are determined or changed to make the appropriate polarities appearing on the magnetic pole surface in each of the unit cores 221A, 221B, when the appropriate magnetic fields are generated by changing the directions of currents flowing in the excitation windings 233A-233C and are applied to the magnetic poles of the permanent magnet rods. This is done to generate a thrust force between the permanent magnet rows 217 of the permanent magnet rods 211A-211C and the unit cores 221A, 221B to displace the second unit 203 in the axial direction of the shaft 215. In this linear motor, as shown in FIG. 9, for example, a magnetic flux generated by the excitation windings 233A-233C flows in the permanent magnet rod (permanent magnet rod 211B) inside the excitation winding 233B and the inner circumferential surface (magnetic pole surface) surrounding the through-hole 229B of the unit core 221B, and then branches into the inner circumferential surface (magnetic pole surface) surrounding the through-hole 229A of the unit core 221B and the inner circumferential surface (magnetic pole surface) surrounding through-hole 229C of the unit core 221B. Then, the magnetic flux that has entered into the inner circumferential surface (magnetic pole surface) surrounding the through-hole 229A of the unit core 221B flows in the inner circumferential surface (magnetic pole surface) surrounding the through-hole 229A, the permanent magnet rod (permanent magnet rod 211A) inside the excitation winding 233A, the inner circumferential surface (magnetic pole surface) surrounding the through-hole 229A of the unit core 221A, the inner circumferential surface (magnetic pole surface) surrounding the through-hole 229B of the unit core 221A, and the permanent magnet rod (permanent magnet rod 211B) inside the excitation winding 233B in this order. The magnetic flux that has entered into the inner circumferential surface (magnetic pole surface) surrounding the through-hole 229C of the unit core 221B flows in the inner circumferential surface (magnetic pole surface) surrounding the through-hole 229C, the permanent magnet rod (permanent magnet rod 211C) inside the excitation winding 233C, the inner circumferential surface (magnetic pole surface) surrounding the through-hole 229C of the unit core 221A, the inner circumferential surface (magnetic pole surface) surrounding the through-hole 229B of the unit core 221A, and the permanent magnet rod (permanent magnet rod 211B) inside the excitation winding 233B in this order. Therefore, there is no need to provide the conventional cylindrical yoke structure.

While, in the linear motor of the third embodiment described above, three (n=1) permanent magnet rods 211A-211C are used as 3n permanent magnet rods, this invention can also be applied to cases where the number of permanent magnet rods to be used is other multiple of three, such as six (n=2) and nine (n=3). In that case, of the 3n permanent magnet rods, a first group of n permanent magnet rods, a second group of n permanent magnet rods and a third group of n permanent magnet rods are so arranged that their permanent magnet rows of the three groups are arranged with a positional difference of 120° in an electrical angle from each other. Arrangement should also be made to ensure that n excitation windings of the winding set through which the first group of n permanent magnet rods extend, n excitation windings of the winding set through which the second group of n permanent magnet rods extend, and n excitation windings of the winding set through which the third group of n permanent magnet rods extend are excited with a phase difference of 120° in an electrical angle from each other.

Figure 10:
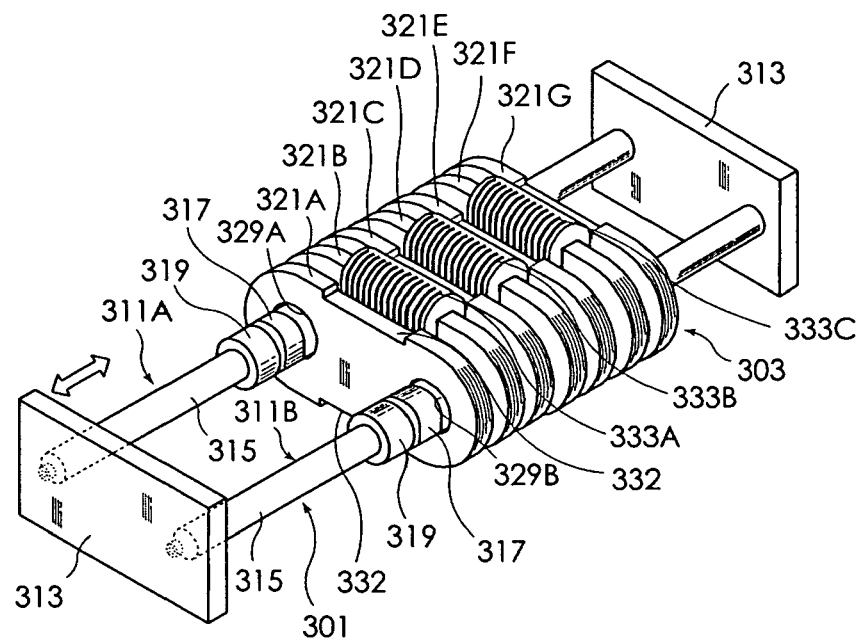
FIG. 10 is a perspective view showing a first unit and a second unit in a linear motor of a fourth embodiment of this invention.

FIG. 10 is a perspective view of a first unit 301 and a second unit 303 of the linear motor as a fourth embodiment of this invention. In this linear motor, the first unit 301 comprises two permanent magnet rods 311A, 311B. A permanent magnet row 317 of the permanent magnet rod 311A is arranged with a positional difference of 180° in an electrical angle from a permanent magnet row 317 of the permanent magnet rod 311B. More precisely, any one of the permanent magnets 319 with a polarity, on the permanent magnet rod 311A, and any one of the permanent magnets 319 with the other polarity, on the permanent magnet rod 311B, are both located at a same distance away from one edge of each of the permanent magnet rods 311A and 311B, and have the opposite polarities.

Figure 11:
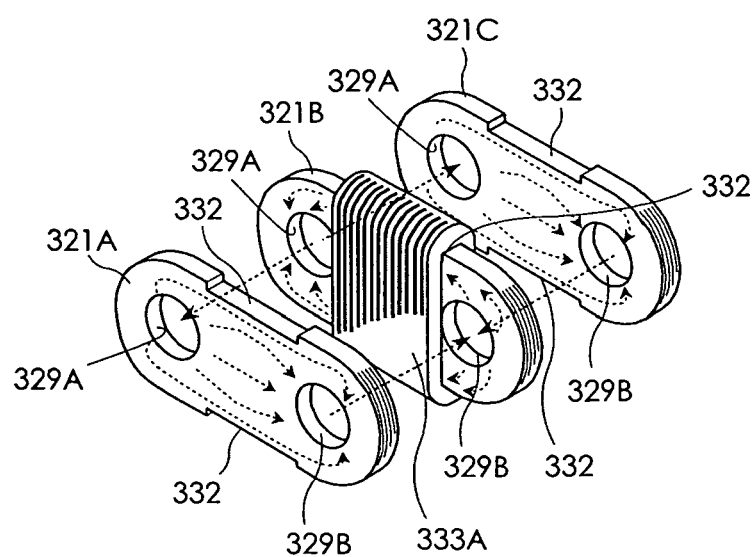
FIG. 11 is an exploded perspective view showing a part of the second unit in the linear motor of the fourth embodiment of this invention.

The second unit 303 comprises seven unit cores 321A-321G and three excitation windings 333A-333C. The seven unit cores 321A-321G are arranged in an axial direction of a shaft 315. Each of the unit cores 321A-321G has two circular through-holes 329A, 329B through which the two permanent magnet rods 311A, 311B loosely extend respectively and two recessed portions 332. Inner circumferential surfaces surrounding the through-holes 329A, 329B form magnetic pole surfaces of the unit cores 321A-321G. The two recessed portions 332 are formed in a pair of side surfaces of each unit core extending in the direction in which the through-holes 329A, 329B are arranged. The recessed portions 332 are open in the direction of thickness of the unit cores 321A-321G and toward the sides. As shown in FIG. 11, the excitation windings 333A-333C are wound on a central portion of even-numbered unit cores 321B, 321D, 321F counted from the end, with a part of each excitation winding fitted in the two recessed portions 332, so that a magnetic flux is generated in a direction that the two through-holes 329A, 329B are arrayed. In this example, the excitation winding 333A wound on the unit core 321B is excited with a phase difference of 60 electrical degrees from the excitation winding 333B wound on the unit core 321D,e, and the excitation winding 333B wound on the unit core 321D is excited with a phase difference of 60 electrical degrees from the excitation winding 333C wound on the unit core 321F. More precisely, U phase, −V phase (a phase with electrical wiring connected in a direction reverse to that of V phase) and W phase current flow in the excitation windings 333A-333C respectively. A part of each excitation winding 333A-333C is held between the unit core on which the excitation winding is wound and the adjoining cores at both sides of the unit core.

In this example of linear motor, when the first unit 301 is constructed as a stator and the second unit 303 as a moving member, the first unit 301 needs to be secured to the mount and the second unit 303 movably mounted on the mount, as in the first embodiment of FIG. 1. Where the first unit 301 is constructed as a moving member and the second unit 303 as a stator, the first unit 301 needs to be movably mounted on the mount and the second unit 303 secured to the mount, as in the second embodiment of FIG. 6.

In the linear motor of this example, the directions of currents flowing in the excitation windings 333A-333C are determined or changed to make the opposite polarities appearing on the magnetic pole surfaces of the unit cores 321A-321G, when the appropriate magnetic fields are generated by changing the direction of currents flowing in the excitation windings 333A-333C and are applied to the magnetic poles of the permanent magnet rods. This is done to generate a thrust force between the permanent magnet rows 317 of the permanent magnet rods 311A, 311B and the unit cores 321A-321G to displace the second unit 303 in the axial direction of the shaft 315. In this linear motor, a magnetic flux generated by the excitation winding 333A flows in two routes, as shown in FIG. 11. In the one route, the flux flows in the inner circumferential surface (magnetic pole surface) surrounding the through-hole 329A of the unit core 321B, the permanent magnet rod (permanent magnet rod 311A) inside the through-hole 329A, the inner circumferential surface (magnetic pole surface) surrounding the through-hole 329A of the unit core 321A, the inner circumferential surface (magnetic pole surface) surrounding the through-hole 329B of the unit core 321A, the permanent magnet rod (permanent magnet rod 311B) inside the through-hole 329B, the inner circumferential surface (magnetic pole surface) surrounding the through-hole 329B of the unit core 321B in this order, and the inner circumferential surface (magnetic pole surface) surrounding the through-hole 329A of the unit core 321B. In another route, the flux flows in the inner circumferential surface (magnetic pole surface) surrounding the through-hole 329A of the unit core 321B, the permanent magnet rod (permanent magnet rod 311A) inside the through-hole 329A, the inner circumferential surface (magnetic pole surface) surrounding the through-hole 329A of the unit core 321C, the inner circumferential surface (magnetic pole surface) surrounding the through-hole 329B of the unit core 321C, the permanent magnet rod (permanent magnet rod 311B) inside the through-hole 329B, the inner circumferential surface (magnetic pole surface) surrounding the through-hole 329B of the unit core 321B in this order, and the inner circumferential surface (magnetic pole surface) surrounding the through-hole 329A of the unit core 321B. Therefore, there is no need to provide the conventional cylindrical yoke structure.

Figure 12:
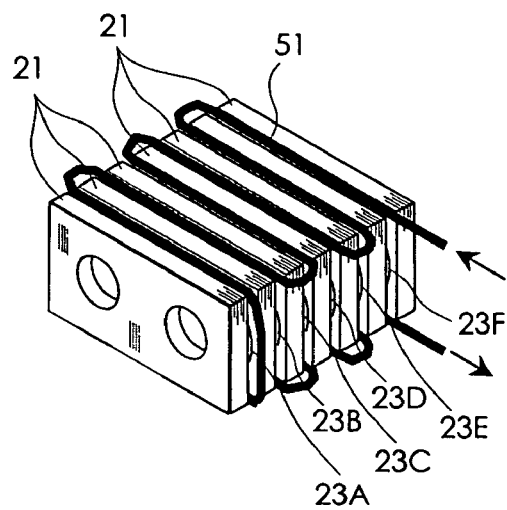
FIG. 12 is a perspective view showing a cooling pipe installed in the second unit of the linear motor of the first embodiment.
Figure 13:
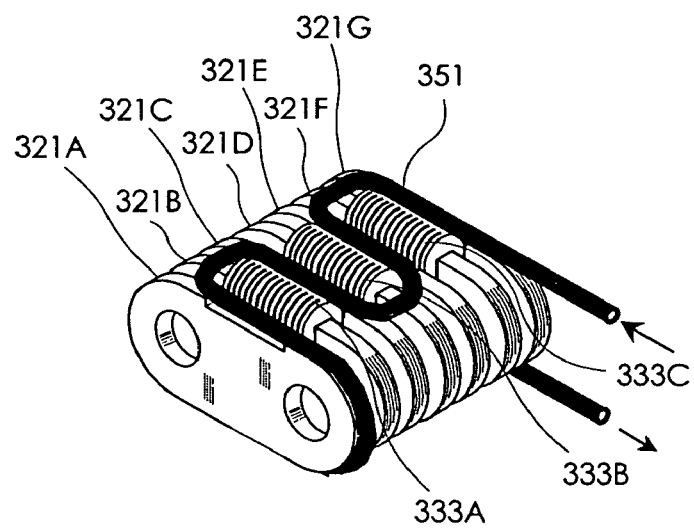
FIG. 13 is a perspective view showing a cooling pipe installed in the second unit of the linear motor of the fourth embodiment.

In the second unit of the linear motors of the first to fourth embodiment, the cooling pipe may be laid partly along the excitation winding. For example, FIG. 12 shows a cooling pipe 51 installed in the second unit 1 of the linear motor of the first embodiment shown in FIG. 1. The cooling pipe 51 winds through an air gap between the adjoining two of the seven unit cores so that it is in contact with the winding sets 23A-23F. FIG. 13 shows a cooling pipe 351 installed in the second unit 301 of the linear motor of the fourth embodiment 4 shown in FIG. 10. The cooling pipe 351 winds on the side surface of the seven unit cores 321A-321G so that it is in contact with the excitation windings 333A-333C.

Further, the present invention is not limited to this embodiment, but various variations and modifications may be made without departing from the scope of the present invention.

What is claimed is:

1. A linear motor comprising;
   a first unit having 2n permanent magnet rods arranged parallel at predetermined intervals (n is a natural number) and a rod support member supporting the 2n permanent magnet rods arranged parallel at predetermined intervals, the 2n permanent magnet rods each comprising a magnetically permeable shaft and a permanent magnet row having a plurality of permanent magnets, the permanent magnets being so magnetized that each has a magnetic pole with one polarity on its entire outer circumferential surface and arranged on the shaft in such a manner that opposite polarities alternately appear in an axial direction of the shaft; and
   a second unit having unit cores and winding sets, the unit cores each having 2n through-holes through which the 2n permanent magnet rods loosely extend respectively, the winding sets each having 2n excitation windings, the excitation windings each being so formed that a winding conductor is wound in a ring-like shape and has a space surrounded by the winding conductor, through which the corresponding permanent magnet rod loosely extends, the winding sets being arranged in such a manner that the excitation windings each corresponds to each of the permanent magnet rods, the unit cores and the winding sets being alternately arranged in the axial direction;
   wherein the first unit and the second unit are so constructed that one of the first unit and the second unit functions as a moving member and the other as a stator;
   wherein the 2n permanent magnet rods are so arranged that a positional difference in an electrical angle between each of the permanent magnet rows in the n permanent magnet rods of the 2n permanent magnet rods and each of the permanent magnet rows of the remaining n permanent magnet rods in the 2n permanent magnet rods is 180°;
   wherein n of the excitation windings in each winding set through which the n permanent magnet rods extend and n of the excitation windings of each winding set through which the remaining n permanent magnet rods extend are excited with a phase difference of 180° in an electrical angle between them,
   wherein, among the excitation windings arranged in the axial direction, three consecutive excitation windings are excited with a phase difference of 120° in an electrical angle.

2. A linear motor according to claim 1,
   wherein the first unit and the second unit are so constructed that the first unit functions as a stator and the second unit as a moving member.

3. A linear motor according to claim 1,
   wherein the first unit and the second unit are so constructed that the first unit functions as a moving member and the second unit as a stator.

4. A linear motor according to claim 1, wherein the unit cores are formed of a plurality of electromagnetic steel plates laminated together in the axial direction.

5. A linear motor according to claim 1, wherein a cooling pipe is arranged partly along the excitation windings.

6. A linear motor according to claim 1, wherein those magnetic pole surfaces of two unit cores situated at the ends of the plurality of unit cores which face the permanent magnet rows are situated farther away from the permanent magnet rows than magnetic pole surfaces of other unit cores.

7. A linear motor according to claim 1, wherein those magnetic pole surfaces of two unit cores situated at both ends of the plurality of unit cores which face the permanent magnet rows are so shaped as to gradually incline away from the permanent magnet rows toward the outside in the axial direction.

8. A linear motor according to claim 1, wherein a magnetic pole pitch $\tau p$ of the permanent magnet rows and a magnetic pole pitch $\tau s$ of the unit cores have a relation of $\tau s{:}\tau p{=}3m{\pm}1{:}3m$ (where m is a natural number).

* * * * *